(No Model.)
R. T. BARTON.
MACHINE FOR MAKING CROWNED NUTS.
No. 346,885. Patented Aug. 10, 1886.
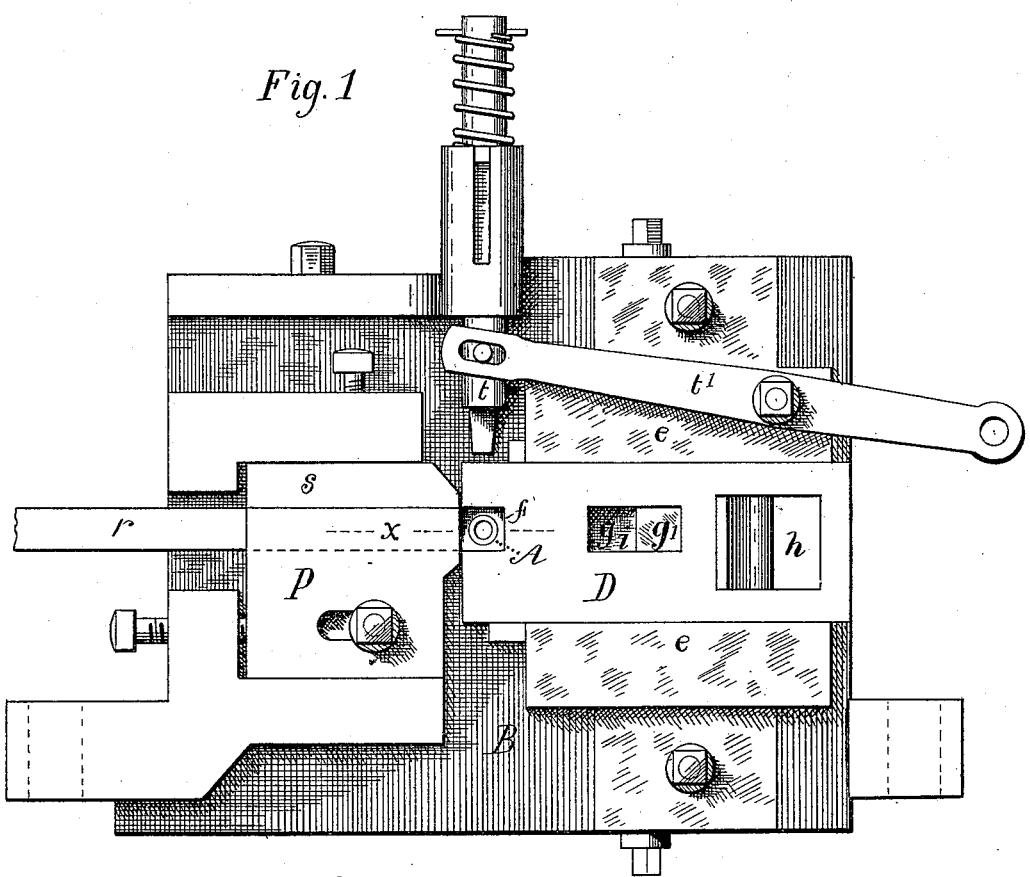
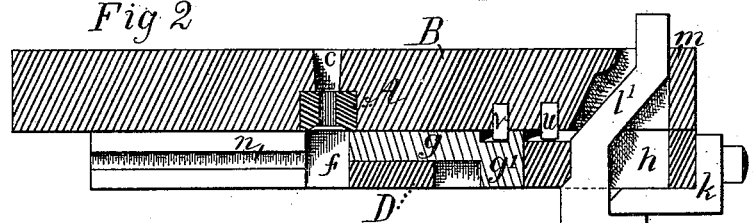
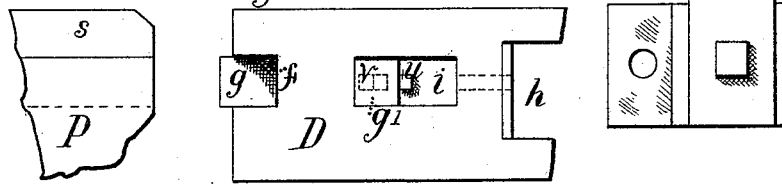
WITNESSES:
George L. Barnes.
L. W. Cleaveland.
INVENTOR
Richard T. Barton
BY Julius Twiss,
ATTORNEY
N. PETERS, Photo-Lithographer, Washington, D. C.

UNITED STATES PATENT OFFICE.

RICHARD T. BARTON, OF NEW HAVEN, ASSIGNOR TO ANDREW H. SMITH, OF NEW HAVEN, AND GEORGE H. ALLEN, OF HAMDEN, CONNECTICUT.

MACHINE FOR MAKING CROWNED NUTS.

SPECIFICATION forming part of Letters Patent No. 346,885, dated August 10, 1886.

Application filed March 27, 1886. Serial No. 196,840. (No model.)

*To all whom it may concern:*

Be it known that I, RICHARD T. BARTON, a citizen of the United States, residing at New Haven, in the county of New Haven and State of Connecticut, have invented a new and useful Improvement in Nut-Machines, of which the following is a specification.

My invention relates to an improvement in nut-machines, and has for its object to provide a die for the formation of crowned nuts.

The invention consists in the novel construction and arrangement of the parts of the die, whereby the removal of the nuts therefrom is readily effected, as hereinafter more fully described and claimed.

In the accompanying drawings, Figure 1 is a front elevation of my improved crowned die and die head or holder. Fig. 2 is a central horizontal section on the line $x$, Fig. 1, showing the means for operating the die. Fig. 3 shows the parts of the die in position for removing the nuts, and Fig. 4 is an end view of the movable die.

Referring to the drawings, A designates a circular perforated die, which is inserted in a circular seat near the center of the head-block or die-holder B, over a perforation, C, extending through to the rear of the holder. The face of the die is depressed or formed concave to shape the crowned surface of the nut, and the perforation in the die is in the center of the concavity, and is somewhat larger than the hole which is to be pierced in the nut. A movable die, D, is fitted to slide in adjustable horizontal guides or ways $e$ on the face of the die-holder, and has a rectangular notch, $f$, of the size of the nut, at its inner end, exactly in the horizontal plane of the axis of the die. A rectangular bar, $g$, of the width of the notch, and somewhat thicker than the nut, is fitted into the back of the die in line with the plane of the notch. The bar is formed with a head, $g'$, which projects into a slot, $i$, in the movable die, and the length of the bar is such that when the head $g'$ is at the outer end of the slot, as shown in Fig. 1, the opposite end of the bar is flush with and forms a part of the side of the notch $f$. The slot is sufficiently long to permit the die to move outward upon the bar until the bar projects beyond the end of the die, as shown in Fig. 3. Motion is imparted to the die by means of a reciprocating bar, L, having an incline part, $l'$, which passes through a slot, $h$, in the die, and bears upon the die on its inner side, and an adjustable cap, $k$, secured to the die on the outer side. The operating-bar is attached to and carried by a suitable reciprocating part of the machine, (not shown,) and its extremity enters a recess in the die-holder, and bears upon a seat, $m$, at the outer side of the recess. A stationary block, P, is adjustably secured on the face of the die-holder on the side opposite to the movable die D, with its upper surface coincident with the upper side of the notch $f$ in the die. The block is formed with a groove, $n$, in its upper edge, to receive the bar-iron $r$, from which the nuts are made. The inner edge of the upper part of the block projects over the edge of the perforated die A, and is adjusted in position to form one side of the nut. A cap, $s$, is fitted upon the upper edge of the grooved block P, and is clamped in place by a set-screw through a flange on the die-holder. A stripping-plunger, $t$, is arranged vertically over the axis of the perforated die, and actuated by a beam-lever, $t'$, and suitable mechanism (not shown) operated from the driving-shaft of the machine.

Constructed as above described and shown, the operation of my improved die is as follows: The die-holder is secured to the ways or frame of a nut-machine having horizontally-acting shearing and piercing punches, and resting against a suitable anvil or back, (not shown,) and adapted to sustain the thrust of the punches. As the reciprocating inclined bar L advances, it moves the movable die D laterally until it abuts against the stationary block P, in which position the sides of the notch $f$ and the inner side of the block P form a square aperture of the size of the nut to be shaped and punched, and with its walls equidistant from the center of the perforated die. In this position the parts of the die are securely held by the inclined bar L while the nut is being formed, the cam or parts which operate the bar being timed to remain at rest meanwhile. The metal bar, $r$, from which the nuts are formed is fed through the groove $n$ in the stationary block P by means of suitable feeding mechanism, (not shown,) and as the cutting-punch (not shown) advances the nut-blank is sheared from the bar and forced back against the concave die A, which gives to the nut the crowning or convex surface desired. The nut remains in this position while the projecting punch advances and pierces the nut, the piercings making their exit through the perforation in the die and aperture C in the die-block. After the punches are withdrawn from the die, the inclined bar L recedes and moves the die D outward, the sliding bar $g$ and finished nut being also carried therewith. When the nut is well clear of the stationary part P, the sliding bar engages a pin, $u$, inserted in the die-holder, and is brought to rest, and as the movable die continues its motion outward it slides along the bar $g$ until its end passes the end of the bar, as shown in Fig. 3, whereby the nut is ejected from the movable die and drops into a suitable receiver. A stop, $v$, inserted in the die-holder and projecting within a slot in the bar $g$, limits the motion of the bar in the opposite direction, and prevents it from working into the notch $f$ when the die is in position for forming the nuts.

I claim as new and desire to secure by Letters Patent—

1. A crowning-die for nut machines, consisting of a perforated die or part, A, having a concavity to shape the crowned surface of the nut, a movable die or part, D, provided with the rectangular notch $f$, adapted to form three sides of the nut-cavity, a bar, $g$, fitted to slide in the movable die and eject the nuts therefrom, the stationary part P, adapted to form the remaining side of the nut-cavity, and having a groove for the reception of the nut-iron, together with stops for limiting the movement of the bar $g$, substantially as described.

2. In a die for forming crowned nuts, the combination of the perforated die or part A, having a concavity to shape the crowned surface of the nut, the movable die or part D, provided with a rectangular notch adapted to form three sides of the nut-cavity, and the stationary part P, adapted to form the remaining side of the nut-cavity, substantially as described.

3. In a die for forming crowned nuts, the combination of the movable die D, having a rectangular notch, $f$, forming three sides of the nut-cavity, the bar $g$, fitted in a groove in the movable die, and provided with a head, $g'$, projecting into a slot in the die, the reciprocating bar L, having an inclined part, $l'$, adapted to operate the movable die laterally, and stops for holding the bar stationary while the die is moved over it to eject the nuts, all arranged substantially in the manner described.

4. In combination, the perforated die A, the movable die D, the bar $g$, the reciprocating part L, having the incline $l'$, the stationary part P, provided with the groove $n$, and a head or holder upon which the respective parts are arranged and secured, substantially in the manner and for the purpose specified.

RICHARD T. BARTON.

Witnesses:
JULIUS TWISS,
DAVID K. ANDREWS.